United States Patent Office 2,901,323
Patented Aug. 25, 1959

2,901,323

PURIFICATION OF CRUDE AQUEOUS
HYDROGEN PEROXIDE

Jerome W. Sprauer, Niagara Falls, N.Y., assignor to E. I. du Pont de Nemours and Company, Wilmington, Del., a corporation of Delaware No Drawing. Application March 31, 1953
Serial No. 346,017

6 Claims. (Cl. 23—207)

This invention relates to the purification of aqueous hydrogen peroxide solutions, particularly those crude solutions obtained in the extraction phase of cyclic processes involving the cyclic reduction and oxidation of alkylanthraquinones in water-immiscible solvents.

The hydrogen peroxide formed in the oxidation stage of processes of the above type is generally separated by extraction with water from the oxidized working solution before the latter is recycled to the hydrogenation stage. Such processes produce hydrogen peroxide efficiently but the crude aqueous hydrogen peroxide extracts obtained are contaminated with objectionable amounts of entrained and dissolved constituents of the working solution, unidentified trace organic impurities and trace inorganic impurities. These contaminants impart undesirable odor, color and instability to the crude extract product and have heretofore presented a serious purification problem.

It is an object of the present invention to provide an effective method for purifying crude aqueous hydrogen peroxide extracts of the above type. A further object is the provision of a method for effectively removing or reducing the amounts of impurities, normaly present in such crude extracts so as to obtain aqueous hydrogen peroxide products substantially odorless and of satisfactory color and stability for general commercial purposes. Other objects will be apparent from the following description.

The objects of the invention are accomplished by extracting the subject crude aqueous hydrogen peroxide extracts with a hydrocarbon liquid having an atmospheric boiling point not exceeding 145° C., and subsequently stripping from the so-extracted aqueous hydrogen peroxide solution residual amounts of the hydrocarbon extracting liquid present therein. The hydrocarbon liquid employed in the extraction step should be chemically inert to aqueous hydrogen peroxide under the conditions employed in the treatments. It has been discovered that such a combination extraction-stripping treatment is highly effective in producing substantially odorless aqueous hydrogen peroxide having good color and stability characteristics.

The extraction of the crude aqueous peroxide solution with the hydrocarbon liquid removes, or largely removes, the organic impurities mainly responsible for the objectionable odor and color of the crude product. These impurities may be in the form of entrained or dissolved constituents of the working solution of the cyclic peroxide producing process. They normally will include high boiling materials, such as the hydrocarbon and alcohol constituents of the working solution, along with small amounts of the hydrogen peroxide producing intermediates of the working solution. Organic oxidation products such as acids and other unidentified by-products of the synthesis process are also usually present. Inorganic impurities such as iron compounds and the like, which invariably enter the crude product in commercial operations of such processes for producing hydrogen peroxide, are also removed to a worthwhile extent by the extraction treatment of the invention.

The aqueous hydrogen peroxide solution remaining after the hydrocarbon extraction treatment will be relatively free from impurities of the types indicated above, but will contain residual amounts of the hydrocarbon solvent employed in the extraction. This residual odorous solvent content is stripped from the extracted peroxide solution by a final aeration treatment or by a fractional distillation treatment so as to leave a substantially odorless commercially acceptable aqueous peroxide.

The hydrocarbon extraction treatment may be carried out either batchwise or continuously employing any of the well-known methods and equipment for effecting extraction of one liquid with another immiscible therewith. Similarly, the stripping treatment may be carried out either batchwise or continuously using known methods and apparatus for aerating a liquid with an inert gas or for fractionally distilling a liquid to separate a low boiling fraction. Both treatments are conveniently carried out in multi-stage, continuous, countercurrent operations.

If the stripping treatment is an aeration treatment, it will generally be effected at about normal pressure at a temperature not exceeding about 100° C., the preferred temperatures ranging from about 30 to 50° C. Lower temperatures can be used but are somewhat less effective, whereas temperatures above about 60° C. are generally avoided for stability reasons. The aeration treatment will be continued until residual amounts of the hydrocarbon solvent have been substantially completely removed to leave a substantially odorless peroxide solution. The time required to accomplish this will depend upon the effectiveness of the contact between the aerating gas and the solution, the temperature, the gas flow and the particular hydrocarbon used in the extraction step. The aerating gas can be any gas such as air, nitrogen, steam or the like which is chemically inert towards the hydrogen peroxide solution.

Residual amounts of the hydrocarbon can also be stripped from the hydrocarbon-extracted aqueous hydrogen peroxide solution by fractional distillation methods carried out either batchwise or continuously. Such distillations will generally be effected at a pressure not exceeding about 200 mm. Hg for safety reasons. Preferably, the pressure will not exceed that corresponding to a boiling temperature of 100° C.; most preferably, it will not exceed that corresponding to a boiling temperature of 60° C. The residual amounts of hydrocarbon can be stripped out, and the hydrogen peroxide solution can be concentrated simultaneously in such distillations if desired.

The temperature conditions indicated for the stripping treatment are generally applicable to the initial extraction with the hydrocarbon solvent. Pressure is not an important factor in the extraction stage and pressures approximating atmospheric pressure will generally be most convenient. However, higher or lower pressures can be used depending upon the solvent chosen. If it is desired to employ as the extraction solvent a hydrocarbon that is not normally a liquid under atmospheric conditions, higher pressures and/or lower temperatures at which the hydrocarbon is liquid can be used, provided the aqueous peroxide solution remains liquid under the conditions chosen. Thus, if it is desired to employ propane or butane as the extracting liquid, the extraction should be carried out at a pressure which is at least sufficiently high to maintain the hydrocarbon liquid at the temperature of operation.

Any hydrocarbon which will be liquid and is inert towards the aqueous peroxide under the chosen operating conditions, and which is sufficiently volatile to permit effective removal of residual amounts thereof in the stripping step, can be used successfully as the solvent in the extraction step. For practical purposes, hydrocarbons having an atmospheric boiling point not higher than about 145° C. are sufficiently volatile; those whose boiling points do not exceed 115° C. are preferred. Hydrocarbons which have no aliphatic unsaturation in their molecular structure, e.g. the aromatic, aralkyl, and the cyclic and acyclic saturated aliphatic hydrocarbons, and which meet the above boiling point requirement and are also liquid under operable temperature and pressure conditions, are suitable extracting liquids for the present purpose. They are practically completely inert to aqueous hydrogen peroxide, have a low solubility therein and are poor solvents for hydrogen peroxide. On the other hand, they are excellent solvents for the objectionable impurities, particularly the organic impurities, normally present in the subject crude peroxide solutions.

Specific examples of suitable hydrocarbon solvents are n-butane, n-pentane, isopentane; the hexanes and the heptanes; cyclopentane, cyclohexane and methylcyclohexane; and benzene, toluene and the xlyenes. Of these, commercial "heptane," a petroleum cut boiling in the range of about 97 to 101° C. and comprising a mixture of alkanes, chiefly heptane, and cycloalkanes with a small amount of aromatic hydrocarbons is generally preferred on the basis of cost, non-toxicity, chemical inertness, low solubility in the hydrogen peroxide extract and vice versa, good solubility of the objectionable impurities therein, effective removal of residual solvent from the extracted peroxide solution, and the ease of recovery of the solvent.

Example 1

A crude aqueous extract product containing 15.1% $H_2O_2$ by weight was obtained by the aqueous extraction of working solution from the oxidizer in a cyclic reduction-oxidation system employing a working solution of 2-ethylanthraquinone dissolved in a mixture of benzene and diisobutylcarbinol. The extract product had an objectionable strong organic odor and an off color. A 50 ml. portion was extracted batchwise with three successive 20 ml. portions of benzene and the extracted product was then aerated thoroughly with filtered air at room temperature. The treated product was odorless and substantially colorless.

Example 2

In a series of tests, crude aqueous hydrogen peroxide extract containing about 35% $H_2O_2$ by weight obtained from a cyclic reduction-oxidation process employing a working solution of 2-t-butylanthraquinone in a mixture of commercial methylnaphthalene and diisobutylcarbinol as solvent, was extracted batchwise three times with commercial heptane using 0.1 volume of heptane per volume of crude extract. The original crude product was unfit for general commercial use due to an objectionable strong organic odor, an off color, and poor stability. The extracted product was then aerated at room temperature with a finely-dispersed air stream for 20 to 30 minutes until all residual heptane was removed. In these tests, the entrained organic working solution from the synthesis process was completely removed and the dissolved carbon content of the aqueous peroxide was reduced on the average from 0.043% to 0.033% by the extraction-aeration treatments, showing effective reduction in the amount of organic impurities. Furthermore, the treated product was rendered substantially odorless and was of improved stability and color due to the removal of impurities. The iron content of crude aqueous peroxide similar to that described above was reduced on the average from 0.41 to 0.25 p.p.m. Fe by such a heptane extraction and aeration treatment.

Example 3

In a continuous operation, crude aqueous hydrogen peroxide extract was produced as indicated in Example 2 at a temperature of 35–40° C. at a rate of about 15–20 pounds per hour at about 35% $H_2O_2$ concentration. The crude extract was countercurrently contacted with 30 to 45 ml./min. of commercial heptane in a 2 in. by 10.5 ft. glass extraction tower packed with ¼ in. ceramic Raschig rings. The aqueous extract was then countercurrently contacted with 1–3 cubic feet per minute of air at a temperature of 40 to 60° C. in a 3 in. by 6 ft. tower section packed with ⅜ in. Raschig rings. The treated product was substantially odorless, clear, and colorless and was of satisfactory commercial quality; whereas the crude product was hazy, had an objectional strong organic odor, a slight color, and poor stability.

While the major accomplishment of present purifying treatment is the removal or reduction of organic impurities, it also effects removal of inorganic impurities and produces significant improvement in color and stabilty. If further improvement in product quality is desired, the present treatment may be supplemented by other treatments, e.g. by the addition of stabilizers. Many effective stabilizers for hydrogen peroxide are known. Those which are insoluble in hydrocarbon solvents, e.g. inorganic stabilizers such as sodium stannate and sodium pyrophosphate, can be added either before or after the present purifying treatment. If an organic stabilizer is to be used, addition will generally be made after the purifying treatment.

The present method is applicable to the purification of any crude aqueous hydrogen peroxide extract obtained in a cyclic reduction-oxidation process employing a working solution comprising an alkylanthraquinone dissolved in a water-immiscible solvent. The $H_2O_2$ content of such crude solutions may vary considerably but usually will be within the range 10 to 50% $H_2O_2$ by weight. 2-t-butylanthraquinone is a particularly effective intermediate in such processes, as disclosed in the pending Hinegardner application Serial No. 125,831, filed November 5, 1949, and issued September 14, 1954 as Patent 2,689,169. Other effective alkylanthraquinones are the 2-methyl, 2-ethyl, 2-n-propyl, 2-secondary butyl, 2-secondary amyl, 1,3-dimethyl and the like anthraquinones. The water-immiscible solvent will generally be a mixture of a hydrocarbon with an alcohol e.g. mixtures of a hydrocarbon such as benzene, toluene, or xylene with an alcohol such as cyclohexanol, methylcyclohexanol, amyl alcohol or isoheptyl alcohol. Particularly effective solvent mixtures are mixtures of a monomethyl- or dimethyl-naphthalene with a primary or secondary nonyl alcohol, especially mixtures of alpha-methylnaphthalene with diisobutylcarbinol, as disclosed in the pending application of Harris and Sprauer Serial No. 125,847, filed November 5, 1949, and issued February 9, 1954 as Patent 2,668,753.

I claim:

1. In a process for producing hydrogen peroxide by alternately hydrogenating a solution of an alkyl anthraquinone in a water-immiscible solvent and oxidizing the resulting solution of an alkylanthrahydroquinone to regenerate said solution of an alkylanthraquinone for recycling after separating therefrom the hydrogen peroxide which is simultaneously formed, said hydrogen peroxide being separated in the form of a crude aqueous solution thereof containing from 10 to 50% $H_2O_2$ by weight, the improvement comprising extracting said crude solution with an inert hydrocarbon liquid having an atmospheric boiling point not exceeding 145° C., and stripping residual amounts of said hydrocarbon liquid from the resulting extracted hydrogen peroxide solution.

2. The method of claim 1 wherein the hydrocarbon liquid has an atmospheric boiling point not exceeding 115° C.

3. The method of claim 1, wherein the hydrocarbon liquid is heptane.

4. The method of claim 1 wherein the residual amounts of the hydrocarbon liquid is stripped from the extracted hydrogen peroxide solution by aerating said solution with an inert gas.

5. The method of claim 1 wherein the residual amounts of the hydrocarbon liquid are stripped from the extracted hydrogen peroxide solution by subjecting said solution to fractional distillation.

6. The method of claim 1 wherein the extracting and stripping operations are carried out continuously.

References Cited in the file of this patent

UNITED STATES PATENTS

| | | |
|---|---|---|
| 2,059,569 | Filson et al. | Nov. 3, 1936 |
| 2,158,525 | Riedl et al. | May 16, 1939 |
| 2,298,064 | MacMullin | Oct. 6, 1942 |
| 2,537,516 | Dawsey et al. | Jan. 9, 1951 |

OTHER REFERENCES

Slater et al.: "The Anthraquinone Autoxidation Process for the Production of Hydrogen Peroxide," PB 4336, 1947, pp. 6–10.

Weissberger: "Technique of Organic Chemistry," 1950, vol. III, pp. 172, 188–9, 295–7.

Perry: "Chemical Engineers' Handbook," 3d ed., 1950, pp.582, 714–718.

Mellan: "Industrial Solvent," 2nd ed., 1950, p. 257.